United States Patent
Kim et al.

(10) Patent No.: US 8,818,460 B2
(45) Date of Patent: Aug. 26, 2014

(54) MOBILE TERMINAL AND CONTROLLING METHOD THEREOF

(71) Applicant: LG Electronics Inc., Seoul (KR)

(72) Inventors: Daeun Kim, Seoul (KR); Jinhwa Joung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/659,820

(22) Filed: Oct. 24, 2012

(65) Prior Publication Data

US 2013/0157722 A1  Jun. 20, 2013

(30) Foreign Application Priority Data

Dec. 20, 2011 (KR) ........................ 10-2011-0137994

(51) Int. Cl.
*H04M 1/00* (2006.01)
*H04B 1/38* (2006.01)

(52) U.S. Cl.
USPC .......................... 455/566; 455/343.1; 455/574

(58) Field of Classification Search
CPC ...................... H04M 1/72519; H04M 1/72583; H04W 52/0274; H04W 52/0261
USPC ............. 455/67.11, 343.1, 556.1, 556.2, 557, 455/566, 574; 370/311
See application file for complete search history.

(56) References Cited

U.S. PATENT DOCUMENTS

| 7,769,415 | B2 * | 8/2010 | Vuong et al. ................... 455/574 |
| 8,244,219 | B2 * | 8/2012 | Benninger ................. 455/412.2 |
| 8,270,965 | B2 * | 9/2012 | Bahl et al. ................... 455/552.1 |
| 8,514,759 | B2 * | 8/2013 | Yoon, II ........................ 370/311 |
| 2008/0080457 | A1 | 4/2008 | Cole |
| 2008/0247344 | A1 | 10/2008 | Bahl et al. |

FOREIGN PATENT DOCUMENTS

CN  102103209 A  6/2011

\* cited by examiner

*Primary Examiner* — Quochien B Vuong
(74) *Attorney, Agent, or Firm* — Birch, Stewart, Kolasch & Birch, LLP

(57) ABSTRACT

A mobile terminal including a first wireless communication module; a second wireless communication module; a display unit configured to display an activated screen of a specific application when the specific application is activated; a memory configured to store a control value indicating which specific wireless communication module among the first and second wireless communication modules is to be used when the specific application is activated; and a controller configured to receive an activation signal indicating an activation of the specific application, automatically activate the specific wireless communication module designated by the control value stored in the memory when the specific application is activated, and deactivate the specific wireless communication module, when the specific application is deactivated.

15 Claims, 12 Drawing Sheets

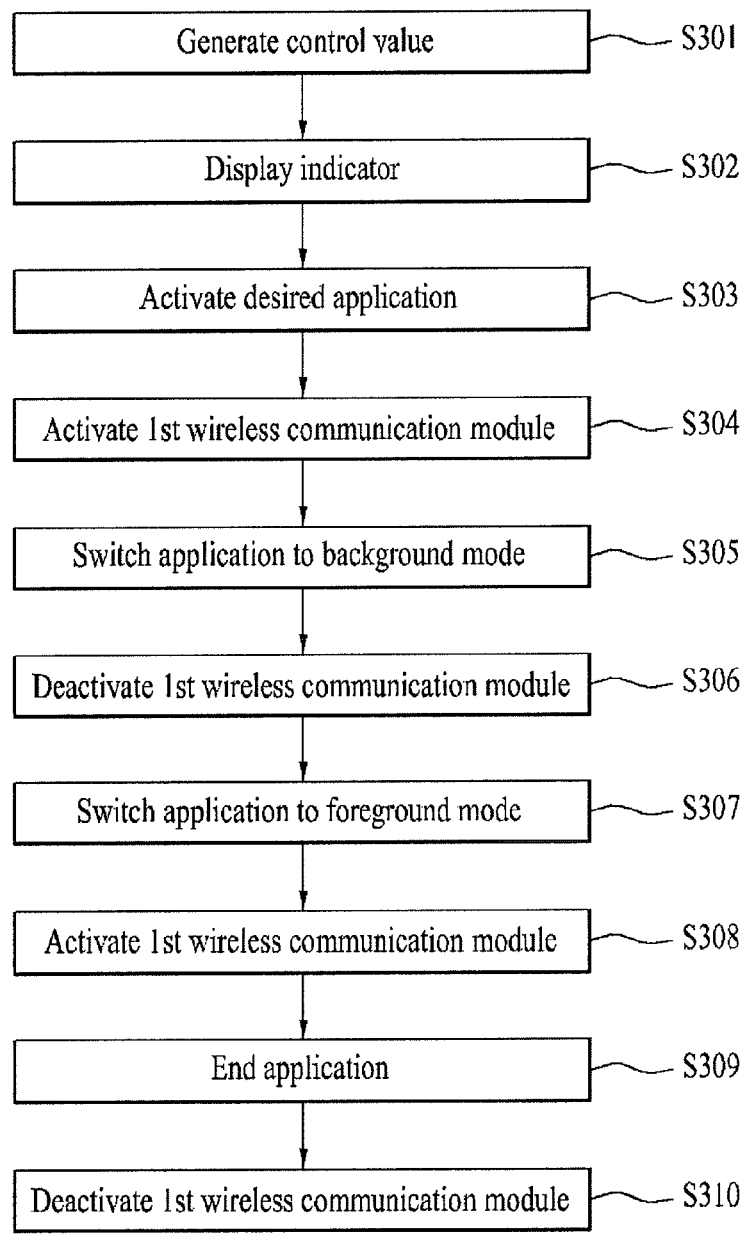

MOBILE TERMINAL AND CONTROLLING METHOD THEREOF

Pursuant to 35 U.S.C. §119(a), this application claims the benefit of earlier filing date and right of priority to Korean Application No. 10-2011-0137994, filed on Dec. 20, 2011, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for activating or deactivating a wireless communication unit automatically in accordance with a presence or non-presence of activation of an application.

2. Discussion of the Related Art

Generally, terminals can be classified into mobile/portable terminals and stationary terminals. The mobile terminals can be further classified into handheld terminals and vehicle mount terminals.

As functions of the terminal are becoming diversified, the terminal is implemented as a multimedia player provided with composite functions such as photographing of photos or videos, playback of music or video files, game play, broadcast reception and the like for example.

Recently, the advent of such an operating system optimized for a mobile device as Android of Google, IOS of Apple and the like enables such a mobile terminal as a mobile phone and the like to evolve into a smart device capable of activating programs of various utilized functions by breaking from the conventional function mainly focused on phone calls. As the demand for such a mobile terminal, which is called a smart device, as a smart phone, a tablet PC and the like is rapidly increasing, numerous application programs executable on the mobile terminal are being created.

However, in order to correctly utilize functions provided by applications, a mobile terminal needs to support various functions including a voice call function. For instance, in order to activate an application related to navigation, a mobile terminal must access the internet to receive map data from an operator server and needs to acquire its location information to mark its location on the received map data.

Thus, in order to access the internet via a mobile terminal or acquire location information of the mobile terminal, a user must manually set On/Off for a prescribed module capable of executing the corresponding function. Hence, a user unskilled in manipulating a mobile terminal is unable to fully use the function provided by a corresponding application. Moreover, it is inconvenient for the user to check the On/Off status of the prescribed module each time.

Moreover, the prescribed module is kept turned on despite the end of the application unless turned off by the user. Hence, even if it is unnecessary to use the prescribed module, the turned-on prescribed module keeps consuming power that lowers the power efficiency of the mobile terminal.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which whether to activate a wireless communication unit is automatically determined in accordance with a presence or non-presence of an activated application.

Another object of the present invention is to provide a mobile terminal and controlling method thereof, by which a wireless communication unit is automatically activated on condition that an application is activated.

A further object of the present invention is to provide a mobile terminal and controlling method thereof, by which a wireless communication unit is automatically deactivated on condition that an application is deactivated.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a first wireless communication module, a second wireless communication module, a display unit displaying an activated screen of a specific application, a memory storing the specific application, and a controller, if the specific application is activated, controlling the first wireless communication module to be automatically activated, the controller, if the specific application is deactivated, controlling the first wireless communication module to be deactivated.

Preferably, if the specific application is activated, the controller controls the specific application to enter an active mode. Moreover, if the specific application is ended, the controller controls the specific application to be deactivated.

Preferably, if the specific application enters a background mode from a foreground mode, the specific application is activated. Moreover, if the specific application enters the foreground mode from the background mode, the specific application is deactivated.

Preferably, if the mobile terminal enters a power saving mode from a normal mode, the controller further controls the first wireless communication module to be deactivated. Moreover, if the mobile terminal enters the normal mode from the power saving mode, the controller further controls the wireless communication module to be activated.

In another aspect of the present invention, a method of controlling a mobile terminal includes the steps of activating a first wireless communication module if a specific application is activated and deactivating the first wireless communication module if the specific application is deactivated.

In a further aspect of the present invention, a computer-readable recording medium includes a mobile terminal controlling method recorded therein, the mobile terminal controlling method including a command for activating a first wireless communication module if a specific application is activated and a command for deactivating the first wireless communication module if the specific application is deactivated.

Accordingly, the present invention provides the following effects and/or advantages.

First of all, a mobile terminal according to at least one embodiment of the present invention automatically activates a wireless communication unit if an application is activated.

Secondly, a mobile terminal according to at least one embodiment of the present invention automatically deactivates a wireless communication unit to reduce power consumption if an application is deactivated.

Effects obtainable from the present invention is non-limited by the above mentioned effect. In addition, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a flowchart for a method of controlling a mobile terminal according to one embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
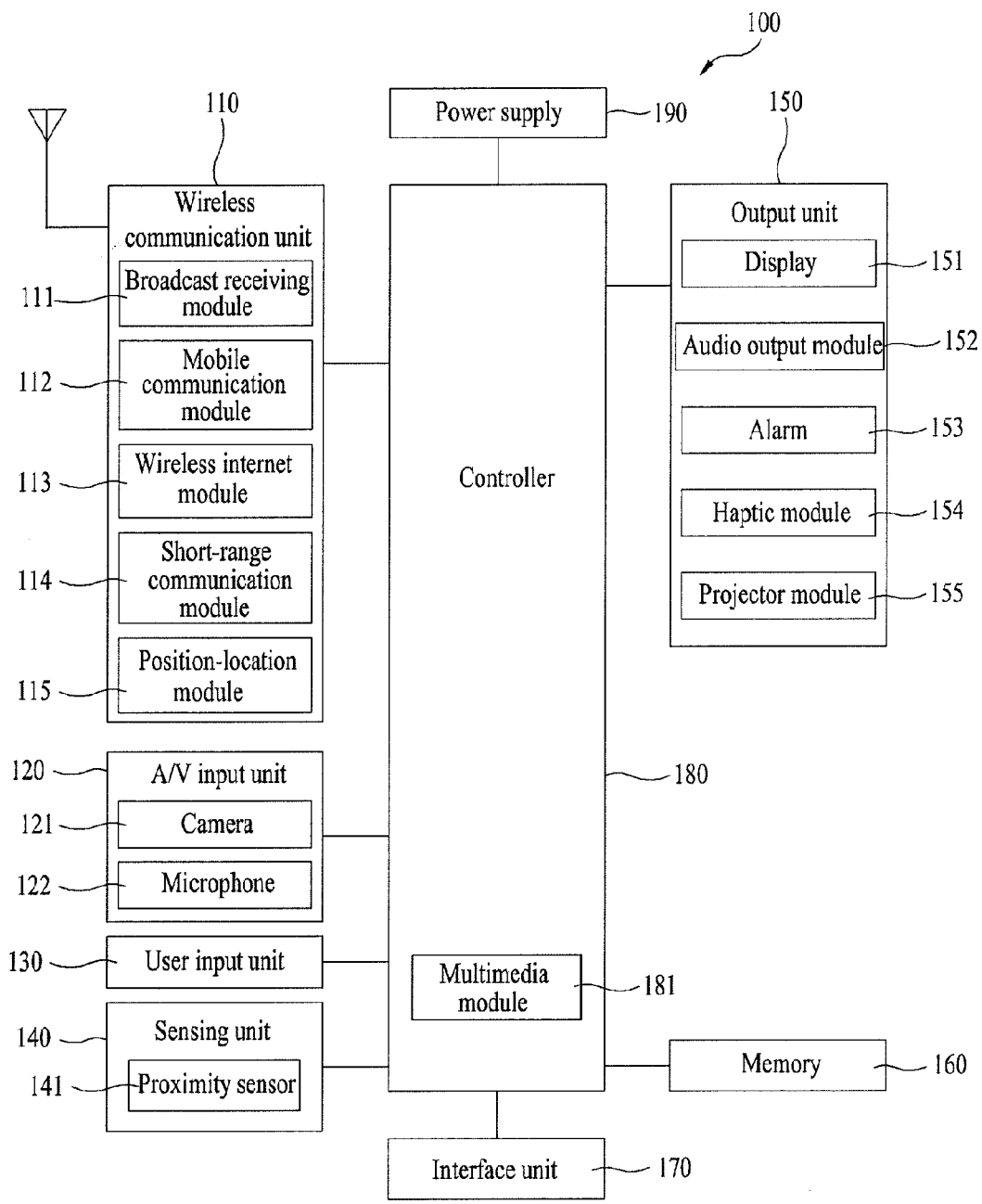
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), HSPA (High Speed Packet Access), GSM (Global System for Mobile communication), CDMA (Code Division Multiple Access), WCDMA, LTE (Long Term Evolution) and the like.

In aspect that an wireless internet access by one of Wibro, HSDPA, HSPA, GSM, CDMA, WCDMA, LTE and the like is achieved via mobile communication network, the wireless internet module 113 capable of performing a wireless internet access via the mobile communication network may be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and a sensor for detecting a touch action (hereinafter also referred to a 'touch sensor') configures a mutual layer structure (hereinafter also referred to a 'touchscreen'), the user can use the display 151 as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

With continued reference to FIG. 1, the proximity sensor 141 can be provided to an internal area of the mobile terminal 100 enclosed by the touchscreen or proximate to the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 can perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
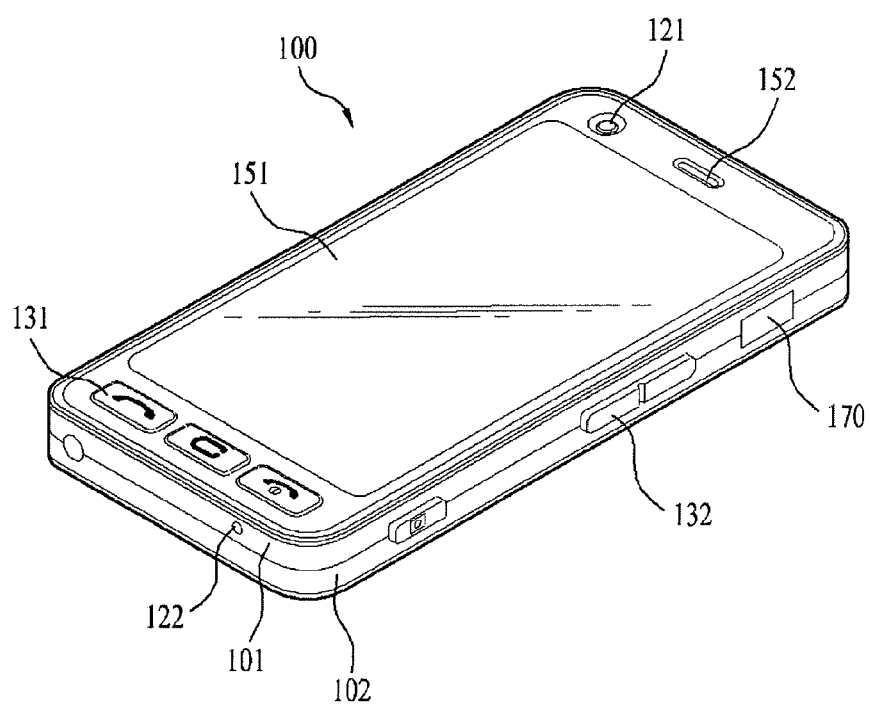
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. A command for volume adjustment of sound output from the audio output unit 152, a command for switching to a touch recognizing mode of the display 151 or the like can be input to the second manipulating unit 132.

For clarity and convenience of the following description, assume that a mobile terminal 100 mentioned in the following description includes at least one of the components shown in FIG. 1. In particular, the mobile terminal 100 according to the present invention may include a first wireless communication module, a second wireless communication module, the display unit 151, the memory 160 and the controller 180.

Each of the first wireless communication module and the second wireless communication module plays a role in receiving data required for driving a network from an external communication network or acquiring a location of the mobile terminal. And the first communication module and the second wireless communication module may be categorized into to the wireless communication unit 110. In particular, each of the first wireless communication module and the second wireless communication module may be a different (or same) one of the mobile communication module 112, wireless internet module 113, short range communication module 114, position location module 115 and the like.

The display unit 151 displays an activated screen of an application and may provide various kinds of menu screens to determine whether to activate the first wireless communication module.

The memory 160 stores applications. In addition, the memory 160 may store various control values related to the applications as well.

The controller 180 activates an application. If the application is activated, the controller 180 controls the first wireless communication module to be activated. If the application is deactivated, the controller 180 controls the first wireless communication module to be deactivated. In this instance, if the application is activated, it may mean that the application starts running or that the application is activated in foreground mode. If the application is deactivated, it may mean that the application is ended or that the application is activated in background mode.

In the following description, the combined relations of the respective components of the mobile terminal 100 are explained in detail.

FIG. 3 is a flowchart for a method of controlling a mobile terminal according to one embodiment of the present invention. Referring to FIG. 3, the controller 180 generates a control value regarding whether to activate the first wireless communication module automatically (S301). In particular, when an individual application or a specific application belonging to a group is activated, the controller 180 can determine whether to activate the first wireless communication module.

Figure 4A:
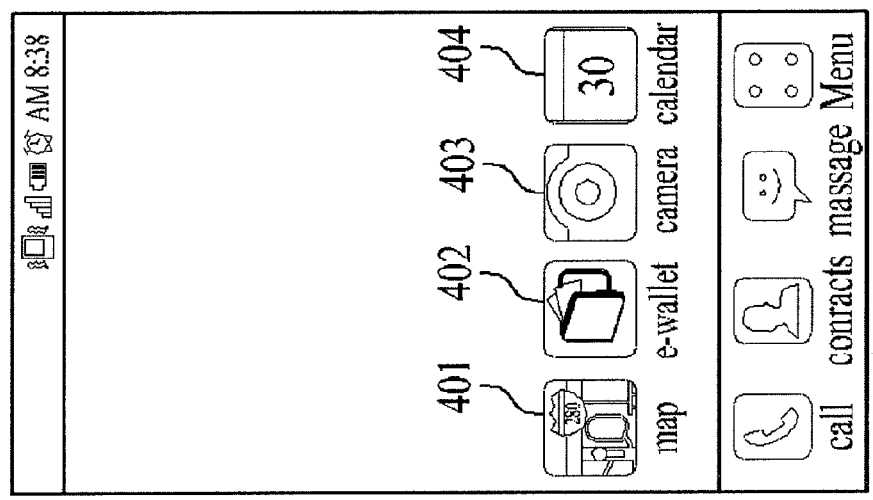
FIGS. 4A to 4C are diagrams illustrating one example of a process for creating a control value per application.
Figure 4B:
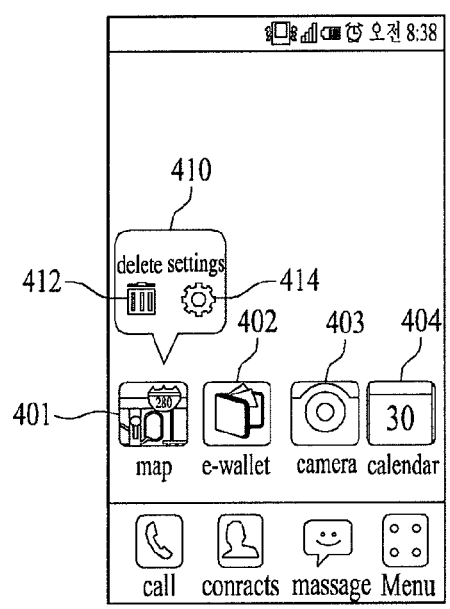
Figure 4C:
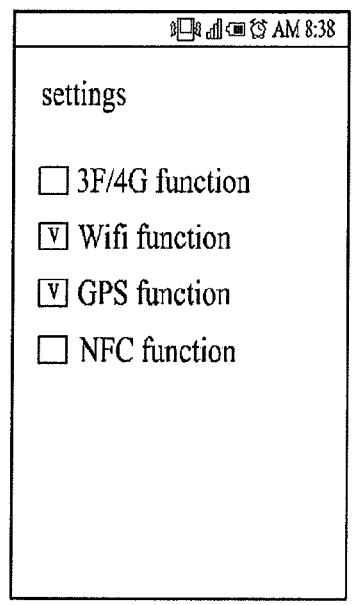

FIGS. 4A to 4C are diagrams illustrating one example of a process for creating a control value per application.

Referring to FIGS. 4A to 4C, the controller 180 controls the display unit 151, as shown in FIG. 4A, to display corresponding icons 401 to 404 of applications saved in the memory 160. If a user touches a prescribed one of the icons 401 to 404 displayed on the screen shown in FIG. 4A, a desired application may be activated. In particular, if the user touches a certain icon for prescribed duration, the controller 180 controls the display unit 151 to display a popup menu 410 (FIG. 4B). If the user selects a button 'delete' 412 from the popup menu 410, the controller 180 can delete the corresponding application from the memory 160. Via a button 'setting' 414, the controller 180 can set whether to activate the first wireless communication module automatically when a specific application is activated.

If the user selects the button 'setting' 414, the controller 180 controls the display unit 151 to display the screen shown in FIG. 4C. If the application is activated, the user can select a wireless communication module to activate automatically from the screen shown in FIG. 4C. In the diagram shown in FIG. 4C, 3G/4G item, Wi-Fi item, GPS item and NFC item may be understood as corresponding to the mobile communication module 112, the wireless internet module 113, the position location module 115 and the short range communication module 114, respectively. However, 3G/4G, Wi-Fi, GPS and NFC are just illustrated to help the understanding of the present invention, by which communication technologies used by the respective wireless communication modules is non-limited.

The user can select a wireless communication module, which will be automatically activated if the corresponding application is activated, from the items related to the enumerated wireless communication modules shown in FIG. 4C. Based on a user input, the controller 180 generates a control value based on the item selected by the user and controls the generated control value to be saved in the memory 160 by being linked with the corresponding application.

In the description with reference to FIG. 4, the control value can be generated for each of the applications, by which the present invention is non-limited. Alternatively, the controller 180 can generate a control value by targeting a group having at least two applications belong thereto.

Figure 5A:
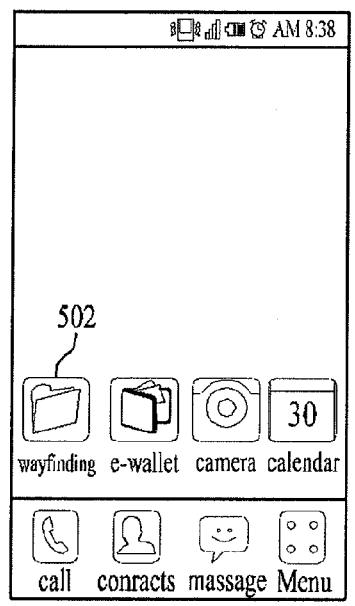
FIGS. 5A to 5C are diagrams illustrating one example of a process for creating a control value by targeting a folder having a plurality of applications belong thereto.
Figure 5B:
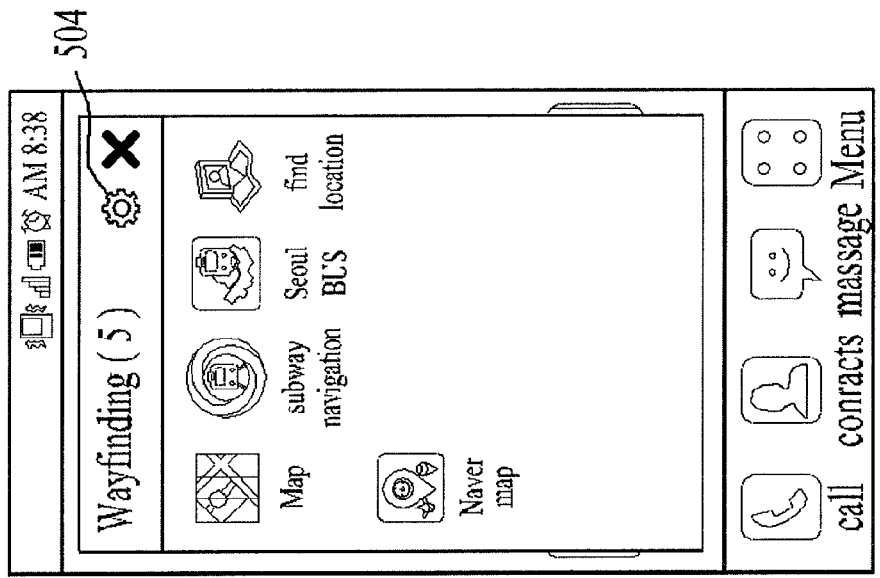
Figure 5C:
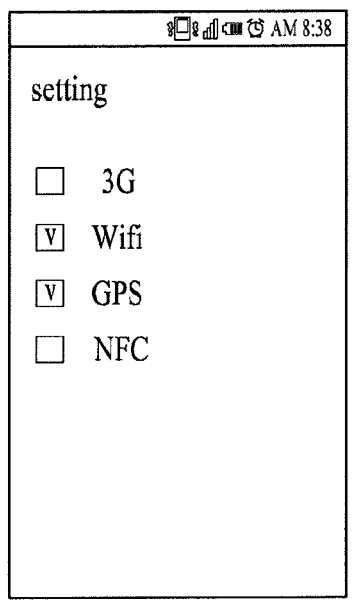

Next, FIGS. 5A to 5C are diagrams illustrating one example of a process for creating a control value by targeting a folder having a plurality of applications. Referring to FIGS. 5A to 5C, if an icon 502 of a folder named 'wayfinding' is touched (FIG. 5A), the controller 180 controls the display unit 151 to display a plurality of applications belonging to the folder named 'wayfinding' (FIG. 5B).

If a user selects a setting icon 504 from the screen shown in FIG. 5B, the controller 180 controls the display unit 151 to display the screen shown in FIG. 5C. If the application belonging to the folder is activated, the user can select a wireless communication module to automatically activate from the screen shown in FIG. 5C. The controller 180 generates a control value based on a user-selected item and can then save the generated control value in the memory 160 by linking it to the folder (or the application belonging to the corresponding folder).

In the description with reference to FIG. 4 or FIG. 5, the controller 180 may generate a control value based on an icon of a specific application, by which the present invention is non-limited.

Figure 6A:
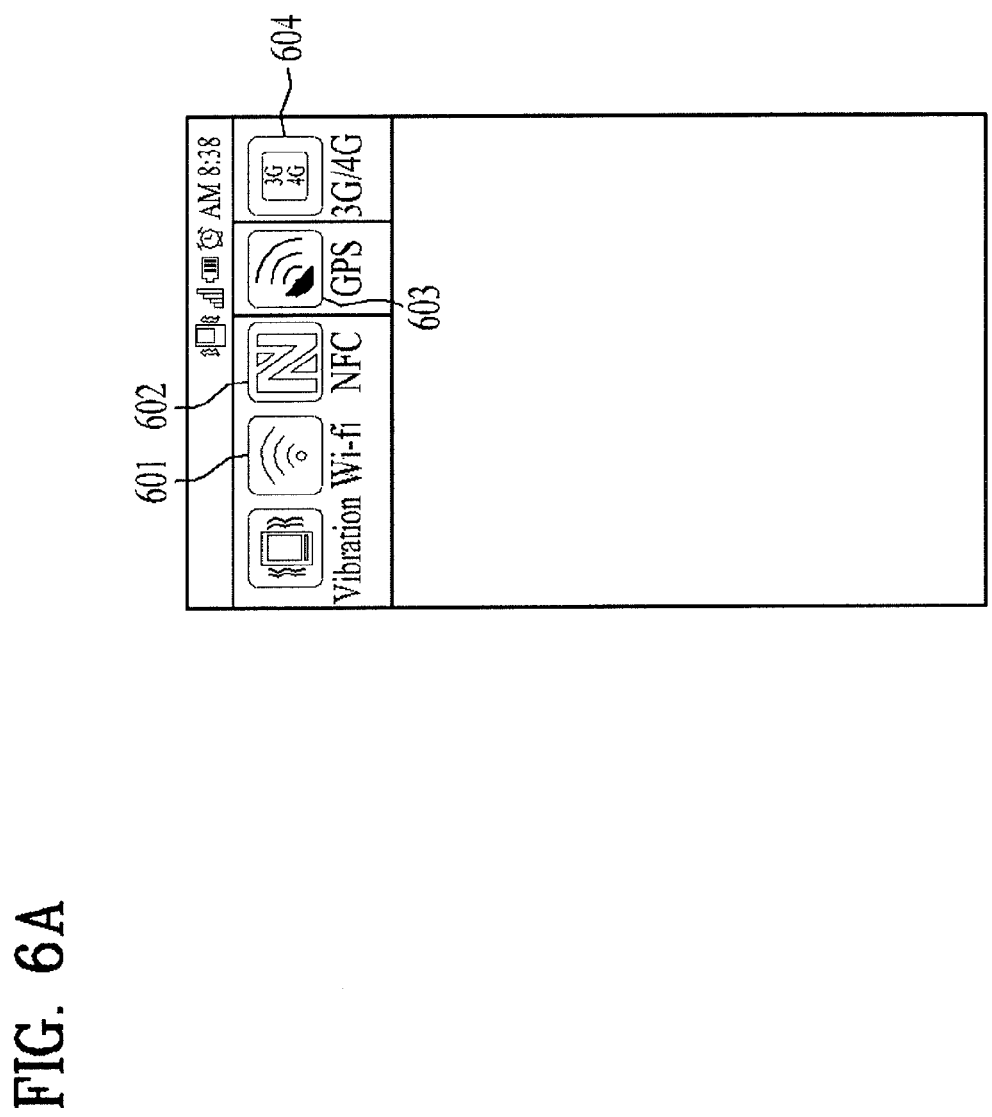
FIGS. 6A to 6C are diagrams illustrating one example of a process for creating a control value based on an external input.
Figure 6B:
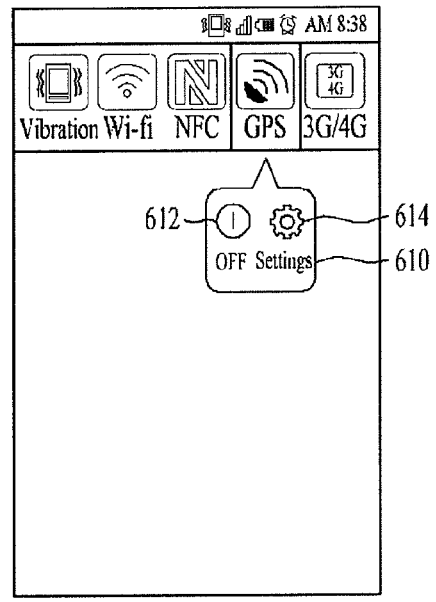
Figure 6C:
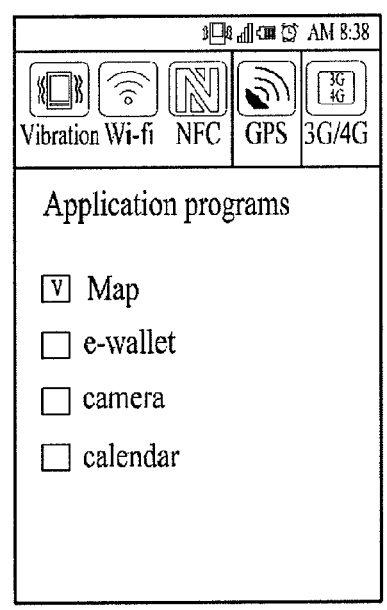

FIGS. 6A to 6C are diagrams illustrating one example of a process for creating a control value based on an external input.

Referring to FIGS. 6A to 6C, the controller 180 controls the display unit 151 to display a system tray which shows information about each wireless communication module (FIG. 6A). Based on icons 601 to 604 of the wireless communication modules displayed on the system tray, a user can check whether each of the wireless communication modules is activated. For example shown in FIG. 6A, the 3G/4G icon 604 indicates a status of the mobile communication module 112 and the Wi-Fi icon 601 indicates a status of the wireless internet module 113. The NFC icon 602 indicates a status of the short range communication module 114 and the GPS icon 603 indicates a status of the position location module 115.

Referring to FIG. 6A, the user can recognize that the position location module 115 is in active mode through the color of the GPS icon 603. If the user presses one of the icons provided to the system tray during a prescribed time, the controller 180 controls the display unit 151 to display a popup menu 610 shown in FIG. 6B. If so, the user can manually determine whether to activate the position location module 115 through a button 'On/Off' 612 provided by the popup menu 610.

The user can select application(s) to activate the position location module 115 automatically using a button 'settings' 614. If the user presses the button 'settings' 614, the controller 180 controls the screen shown in FIG. 6C to be displayed. Through the provided screen shown in FIG. 6C, the user can select an application (or folder) to automatically activate the position location module 115 when the application is activated. For the application selected by the user, the controller 180 may generate and save a control value in order to automatically activate the position location module 115 on condition that the corresponding application is activated.

For example shown in FIG. 6C, for the application 'map' selected by the user, the controller 180 can generate and save a control value that enables the position location module 115 to be automatically activated when the application 'map' is activated.

In the description with reference to FIG. 6, the position location module 115 is used as an example. Moreover, this description with reference to FIG. 6 may apply to a control value generating process in connection with each of the mobile communication module 112, the wireless internet module 113 and the short range communication module 114 as well.

In addition, FIGS. 4 to 6 are just examples to describe the control value generating processes, by which the present invention is non-limited. In addition, partial modifications of the contents shown in FIGS. 4 to 6 or methods derivable easily from the contents shown in FIGS. 4 to 6 pertain to the scope of the appended claims and their equivalents.

Subsequently, with reference to FIG. 3, based on the control value, the controller 180 controls the display unit 151 to display an indicator marked on the corresponding icon or the like (S302). Through the displayed indicator, the user can recognize that the first wireless communication module will be automatically activated on condition that the corresponding application is activated.

Figure 7A:
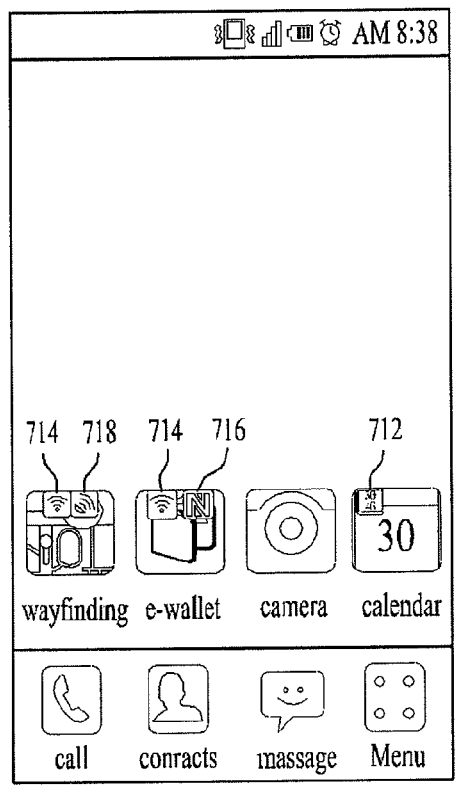
FIG. 7A and FIG. 7B are diagrams illustrating one example of an indicator displayed screen.

Next, FIG. 7A is a diagram illustrating one example of a screen, which displays that an indicator is marked on an application icon. Referring to FIG. 7A, the controller 180 controls the display unit 151 to display an indicator marked on a corresponding application icon. The indicator displayed on the display unit 151 may be different according to the wireless communication modules.

For instance, 3G/4G indicator 712, Wi-Fi indicator 714, NFC indicator 716 and GPS indicator 718 to be displayed for the mobile communication module 112, the wireless internet module 113, the short range communication module 114 and the position location module 115, respectively.

For instance, since the Wi-Fi indicator 714 and the GPS indicator 718 are marked on the icon of the application 'map' shown in FIG. 7A, a user can recognize that the wireless internet module 113 and the position location module 115 will be automatically activated when the application 'map' is activated. In another instance, since the Wi-Fi indicator 714 and the NFC indicator 716 are marked on the icon of the application 'e-wallet' shown in FIG. 7A, a user can recognize that the wireless internet module 113 and the short range communication module 114 will be automatically activated when the application 'e-wallet' is activated.

In still another instance, since the 3G/4G indicator 712 is marked on the icon of the application 'calendar' shown in FIG. 7A, a user can recognize that the mobile communication module 112 will be automatically activated when the application 'calendar' is activated.

Figure 7B:
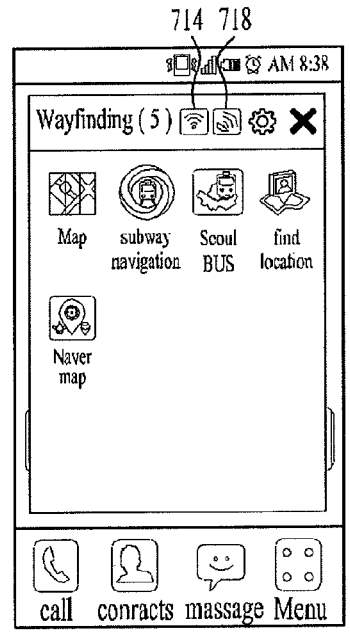

Next, FIG. 7B is a diagram illustrating one example of a screen, which displays that an indicator is marked on a title bar of a folder. Referring to FIG. 7B, at least one of a name (e.g., wayfinding) of a corresponding folder and the number (e.g., 5) of applications belonging to the corresponding folder may be displayed on a title bar. Moreover, the controller 180 controls the display unit 151 to display an indicator to provide information on a wireless communication module automatically activated when the application belonging to the folder is activated.

Using the Wi-Fi indicator 714 and GPS indicator 718 provided to the title bar shown in FIG. 7B, a user can recognize that the wireless internet module 113 and the position location module 115 will be activated if the application belonging to the corresponding folder is activated.

The names, shapes and positions of the indicators shown in FIG. 7A or FIG. 7B are provided to facilitate the description, by which the present invention is non-imited. An indicator of the present invention may be implemented into one of various shapes including numeral, character, color, diagram, figure, symbol and combination thereof. Irrespective of the shape and position of the indicator, if the indicator can provide information indicating whether the first wireless communication module will be activated when a corresponding application is activated, this indicator can be regarded as belonging to the scope of the indicators mentioned in the description of the present invention.

In one example, the controller 180 controls an indicator to be marked on an icon displayed on a home screen only. In this instance, the home screen is the screen displayed in unlock mode of the display unit 151. A user may select various functions provided by the mobile terminal 100 from the home screen. For example, if a user touches an icon displayed on the provided home screen, a corresponding application is activated.

Subsequently, with reference to FIG. 3, if a user selects a specific application, the controller 180 activates the specific application (S303) and controls the first wireless communication module to be automatically activated based on the control value (S304). Moreover, the controller 180 controls the first wireless communication module to be activated if applications belonging to a specific group including the specific application are activated.

For example, as shown in FIG. 5, if a plurality of applications is managed by folder unit, for the applications belonging to a specific folder, the controller 180 can automatically activate the first wireless communication module when the corresponding application is activated.

In doing so, whether the second wireless communication module is activated may have no relation with whether the corresponding application is activated. In particular, the controller 180 can control the second wireless communication module to persistently maintain an active mode (or an inactive mode) until there is a separate external input.

For instance, assuming that the second wireless communication module is the mobile communication module 112, the mobile communication module 112 needs to persistently maintain the active mode in order to receive a voice call signal, a video call signal or a text/multimedia message reception/transmission despite that an application is in active mode. In order to receive a wireless signal externally, the controller 180 controls the mobile communication module 112 to keep running irrespective of a presence or non-presence of activation of a corresponding application.

When both of the mobile communication module 112 and the wireless internet module 113 are simultaneously activated, the controller 180 selects either the mobile communication module 112 or the wireless internet module 113 and controls the selected module to perform data transmission and repletion via internet access. For instance, while the mobile communication module 112 (i.e., the second wireless communication module) is maintained in the active mode, if a specific application is activated to set the wireless internet module 113 (i.e., the first wireless communication module) to be automatically activated, the controller 180 may preferentially attempt an internet access using the wireless internet module 113.

If the corresponding internet is not accessible via the wireless internet module 113 (e.g., if an accessible access point (AP) does not exist around the mobile terminal), the controller 180 can attempt the internet access using the mobile communication module 112. If the corresponding internet is accessed using the mobile communication module 112, an internet service provider (ISP) may charge for this access according to the usage-based model for the corresponding internet service. On the contrary, if the corresponding internet is accessed using the wireless internet module 113, the corresponding internet service may be charged by an internet service provider (ISP) for a fixed rate. Hence, a user may pay a minimum communication cost by using the wireless internet module 113.

In the description of the above examples, the first wireless communication module and the second wireless communication module include the wireless internet module 113 and the mobile communication module 112, by which the present invention is non-limited. Alternatively, each of the first wireless communication module and the second wireless communication module may include one of the mobile communication module 112, the wireless internet module 113, the short range communication module 114 and the position location module 115.

Subsequently, with reference to FIG. 3, while the specific application is in the active mode, if a mode of the specific application is switched to the background mode from the foreground mode (S305), the controller 180 controls the first wireless communication module to be deactivated (S306). If the mode of the specific application is switched to the foreground mode from the background mode (S307), the controller 180 controls the first wireless communication module to be activated (S308). Based on an external input, the controller 180 controls the application to be switched from foreground mode to the background mode or from the background mode to the foreground mode.

If the specific application is ended (S309), the controller 180 controls the first wireless communication module to be deactivated (S310). When the application is deactivated, the power consumed is reduced.

If an application belonging to a group having a specific application is deactivated, the controller 180 controls the first wireless communication module to be deactivated. For instance, for example, as shown in FIG. 5, when a plurality of applications are managed by folder unit, for the applications belonging to a specific folder, the controller 180 can control the first wireless communication module to be automatically deactivated when the corresponding application is deactivated.

In doing so, the second wireless communication module may persistently stay in active mode (or inactive mode) irrespective of deactivation of the corresponding application.

In the description with reference to FIGS. 5A to 5C, a folder is used as a group including a specific application for example, by which the present invention is non-limited. Although applications belong to the same folder, it can set the first wireless communication module to be automatically activated or deactivated for the application belonging to a specific group only.

Figure 8:
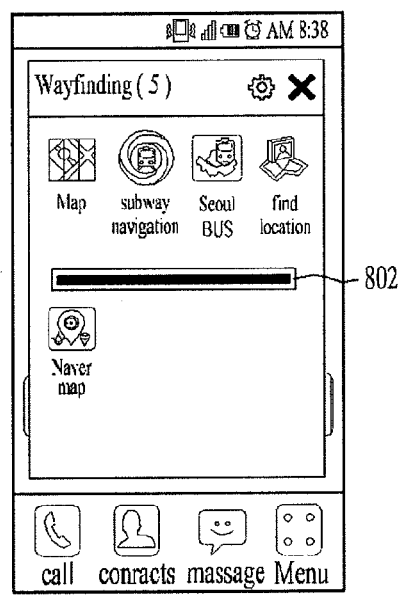
FIG. 8 is a diagram illustrating one example of a screen to display that applications belonging to the same folder are sorted into two groups.

FIG. 8 is a diagram illustrating one example of a screen to display that applications belonging to the same folder are sorted into two groups. Referring to FIG. 8, although applications belong to the same folder, the controller 180 can control the first wireless communication module to be automatically activated on condition that the application situated above a boundary line 802 is activated only.

According to another embodiment of the present invention, although a specific application is activated, the first wireless communication module may not be activated in direct. In particular, after a specific application has been activated, the controller 180 further determines whether a preset condition is met and may the control to determine whether to activate the first wireless communication module.

For instance, if a specific application is activated on a first time zone, the controller 180 controls the first wireless communication module to be activated. If the specific application is activated on a second time zone different from the first time zone, the controller 180 controls the first wireless communication module not to be activated. For example, the first time zone and the second time zone are set to '9 AM to 6 PM' and 'except 9 AM to 6 PM', respectively. The controller 180 may determine whether to activate the first wireless communication module by determining whether the specific application is activated on either the first time zone or the second time zone.

In another instance, if a specific application is activated in a first area, the controller 180 controls the first wireless communication module to be activated. If the specific application is activated in a second area different from the first area, the controller 180 controls the first wireless communication module not to be activated. In particular, when the specific application is activated, the controller 180 determines whether a location of the mobile terminal 100 is situated in the first area. If the mobile terminal 100 is determined as situated in the first area, the controller controls the first wireless communication module to be automatically activated.

On the contrary, if the mobile terminal 100 is determined as situated in the second area, the controller 180 controls the specific application to be activated without activating the first wireless communication module. In doing so, the location information of the mobile terminal 100 is obtained from the position location module 115 or may be obtained from the mobile communication module 112 by CTT (Cell Tower Triangulation). In particular, the position location module 115 or the mobile communication module 112 may configure the second wireless communication module to obtain the location information of the mobile terminal 100 and the second wireless communication module may be maintained in active mode irrespective of activation or deactivation of the specific application.

For this, the following fact is used. First of all, in order to access the internet via the wireless internet module 113, an access point (AP) needs to be situated neighbor to the mobile terminal 100. If a user (e.g., student, office worker, etc.) of the mobile terminal 100 has a regular lifestyle pattern, a time zone and place neighbor to the AP may have a similar pattern every day. If the AP is not situated neighbor to the mobile terminal 100, the internet may not be accessible via the wireless internet module 113 despite that the wireless internet module 113 is in active mode. Hence, the present invention can save the power consumed to activate the wireless internet module 113.

When the first area and the second area include a domestic area and an overseas area, respectively, in order to prevent an excessive fee from being incurred due to a use of an overseas mobile communication network, it can control the first wireless communication module not to be activated in overseas area. For instance, when the mobile terminal 100 situated overseas uses a roaming service, if an internet is accessed via the mobile communication module 112, an excessive fee may be charged by the ISP. In order not to use the mobile communication module 112 overseas, it can control the mobile communication mobile 112 to be available for the domestic area only by setting the second area to overseas.

If a user inputs information on time and/or place, the controller 180 saves the input information on the time and/or place in the memory 160. Thereafter, if a specific application is activated, the saved information may be used as a condition for determining whether to activate the first wireless communication module. In doing so, a second time and a second area may be set to any time and area except a first time and a first area.

According to another embodiment of the present invention, the controller 180 receives AP information indicating whether there is an accessible AP from a base station via the mobile communication module (i.e., a second wireless communication module) 112. In addition, the controller can then further control activation or deactivation (i.e., whether the wireless internet module 113 (i.e., first wireless communication module) will be activated) to be determined based on the received AP information. For instance, if it is determined that an accessible AP exists around the mobile terminal 100 based on the AP information received from the base station, the controller 180 may further control the wireless internet module 113 to be activated together with a specific application activation. On the contrary, if it is determined that an accessible AP does not exist around the mobile terminal 100 based on the AP information received from the base station, the controller 180 can control a specific application to be activated without activating the wireless internet mobile 113.

According to another embodiment of the present invention, if a specific application is activated, a first wireless communication module is activated to enter an active mode. While the first wireless communication module in active mode, if the mobile terminal 100 enters a sleep mode from a normal mode, the controller 180 can control the first wireless communication module to be deactivated. On the contrary, if the mobile terminal 100 wakes up from the sleep mode, the controller 180 controls the first wireless communication module to be activated again.

In FIG. 3, because the indicator displaying step S302 can be omitted, the present invention may be performed by skipping the step S302. In accordance with a user setting, the step S302 may be performed or may not. In particular, the controller 180 controls an indicator to be or not to be marked on an icon or the like in accordance with a user setting.

According to one embodiment of the present invention, the above-described methods can be implemented in a program recorded medium as processor-readable codes. The processor-readable media include ROM, RAM, CD-ROM, magnetic tapes, floppy discs, optical data storage devices, and the like for example and also include transmission via the internet.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a first wireless communication module;
a second wireless communication module;
a display unit configured to display an activated screen of a selected application among a plurality of applications installed on the mobile terminal;
a memory configured to store control values corresponding to each of the plurality of applications and indicating which specific wireless communication module among the first and second wireless communication modules is to be used when each of the plurality of applications is activated; and
a controller configured to:
receive an activation signal indicating an activation of a specific application among the plurality of applications,
search a specific control value among the control values corresponding to the specific application,
if the specific control value indicates that the first wireless communication module is used when the specific application is activated, automatically activate the first wireless communication module when the specific application is activated and deactivate the first wireless communication module when the specific application is deactivated, and
if the specific control value indicates that the second wireless communication module is used when the specific application is activated, automatically activate the second wireless communication module when the specific application is activated and deactivate the second wireless communication module when the specific application is deactivated.

2. The mobile terminal of claim 1, wherein the specific application is activated when the specific application is started and the specific application is deactivated when the specific application is ended, or the specific application is activated when the specific application enters a background mode from a foreground mode and the specific application is deactivated when the specific application enters the foreground mode from the background mode.

3. The mobile terminal of claim 1, wherein if the mobile terminal enters a sleep mode from a normal mode, the controller is further configured to deactivate at least one of the first and the second wireless communication modules activated automatically when the specific application is activated, and if the mobile terminal enters the normal mode from the sleep mode, the controller is further configured to activate at least one of the first and the second wireless communication modules deactivated when the mobile terminal enters the sleep mode.

4. The mobile terminal of claim 1, wherein if the specific application is activated on a first time zone, the controller is further configured to automatically activate at least one of the first and the second wireless communication modules, which is indicated to be used when the specific application is activated, and if the specific application is activated on a second time zone different from the first time zone, the controller is further configured not to automatically activate at least one of the first and the second wireless communication modules although the specific control value indicates that at least one of the first and the second wireless communication modules is used when the specific application is activated.

5. The mobile terminal of claim 1, wherein if the specific application is activated in a first area, the controller is further configured to activate at least one of the first and the second wireless communication modules, which is indicated to be used when the specific application is activated., and if the specific application is activated in a second area different from the first area, the controller is further configured not to automatically activate one of the first and the second wireless communication modules although the specific control value indicates that at least one of the first and the second wireless communication modules is used when the specific application is activated.

6. The mobile terminal of claim 1, wherein the first and the second wireless communication modules include one of a wireless internet module, a short range communication module, a position location module and a mobile communication module, and the second wireless communication module.

7. The mobile terminal of claim 1, wherein the first wireless communication module and the second wireless communication module include a wireless internet module and a mobile communication module, respectively, and if both of the first wireless communication module and the second wireless communication module are in active state, the controller is further configured to access the internet using either the first wireless communication module or the second wireless communication module.

8. The mobile terminal of claim 7, wherein the controller is further configured to access the internet to be preferentially performed via the first wireless communication module.

9. The mobile terminal of claim 8, wherein if an AP (access point) accessible to the first wireless communication module is absent, the controller is further configured to access the internet via the second wireless communication module.

10. The mobile terminal of claim 1, wherein the first wireless communication module and the second wireless communication module include a wireless internet module and a mobile communication module, respectively, and the controller is further configured to determine whether to activate the first wireless communication module based on AP (access point) information received from a base station via the second wireless communication module.

11. The mobile terminal of claim 1, wherein the controller is further configured to display an indicator on a corresponding icon of the specific application to indicate whether at least one of the first and the second wireless communication modules will be automatically activated or deactivated.

12. A method of controlling a mobile terminal, the method comprising:
receiving, via a controller of the mobile terminal, an activation signal indicating an activation of a specific application among a plurality of applications installed on the mobile terminal; and
searching, via the controller of the mobile terminal, a specific control value among control values stored in a memory of the mobile terminal which corresponds to the specific application and indicates that at least one of a first and a second wireless communication module is used when the specific application is activated, wherein if the specific control value indicates that the first wireless communication module is used when the specific application is activated,
automatically activating the first wireless communication module when the specific application is activated, and
automatically deactivating the first wireless communication module when the specific application is deactivated, and
wherein if the specific control value indicates that the second wireless communication module is used when the specific application is activated,
automatically activating the second wireless communication module when the specific application is activated, and
automatically deactivating the second wireless communication module when the specific application is deactivated.

13. The method of claim 12, wherein the specific application is activated when the specific application is started and the specific application is deactivated when the specific application is ended, or the specific application is activated when the specific application enters a background mode from a foreground mode and the specific application is deactivated when the specific application enters the foreground mode from the background mode.

14. The method of claim 12, wherein if the mobile terminal enters a sleep mode from a normal mode, the method further comprises deactivating at least one of the first and the second wireless communication modules activated automatically when the specific application is activated, and if the mobile terminal enters the normal mode from the sleep mode, activating at least one of the first and the second wireless communication modules deactivated when the mobile terminal enters the sleep mode.

15. The method of claim 12, wherein if the specific application is activated on a first time zone, the method further comprises automatically activating at least one of the first and the second wireless communication modules, which is indicated to be used when the specific application is activated, and if the specific application is activated on a second time zone different from the first time zone, not automatically activating at least one of the first and the second wireless communication modules although the specific control value indicates that at least one of the first and the second wireless communication modules is used when the specific application is activated.

* * * * *